INVENTOR.
REYNOLD F. GAMUNDI
ATTORNEY

United States Patent Office 2,982,385
Patented May 2, 1961

2,982,385

ELECTROMAGNETIC DEVICES WITH FRICTION LINING

Reynold F. Gamundi, South Euclid, Ohio, assignor to Eaton Manufacturing Company, Cleveland, Ohio, a corporation of Ohio Filed Oct. 21, 1957, Ser. No. 691,509

6 Claims. (Cl. 192—84)

Broadly, this invention relates to electromagnetic devices of the clutch, brake or the like mechanism type but more specifically, it pertains to magnetic type clutches wherein the driving and driven elements are arranged to be selectively moved into frictional contact with each other, transmitting torque from one rotatable member to another.

In frictionally engaging magnetically actuated clutches, a lining having good wear-resistant characteristics is highly desirable and the provision of a low reluctance flux path is extremely important.

Previously, friction linings have been disposed on one of the movable members wherein the flux path was directed through the lining extending in a circuitous path from the coil and returning thereto, consequently, the reluctance was increased and compensation for the loss of efficiency of the mechanism involved requirements of larger coils transmitting a greater amount of flux to overcome the added resistance.

Applicant's invention provides the necessary wear-resistant properties in the friction lining and further provides a segmental arrangement of the lining overcoming the above stated difficulties.

It is an object of this invention to provide an electromagnetic device dependent upon frictional engagement of its members for transmitting torque from one member to the other.

It is another object of this invention to provide a frictional wear-resistant lining arranged to provide a concentrated flux path through an armature plate.

It is a further object of this invention to provide a fritcional wear-resistant lining in arrangement with an armature plate in an electromagnetic device wherein engagement noises are eliminated.

These and other objects and advantages will become more apparent from the following detailed description of the device and from the accompanying drawings.

Figure 1:
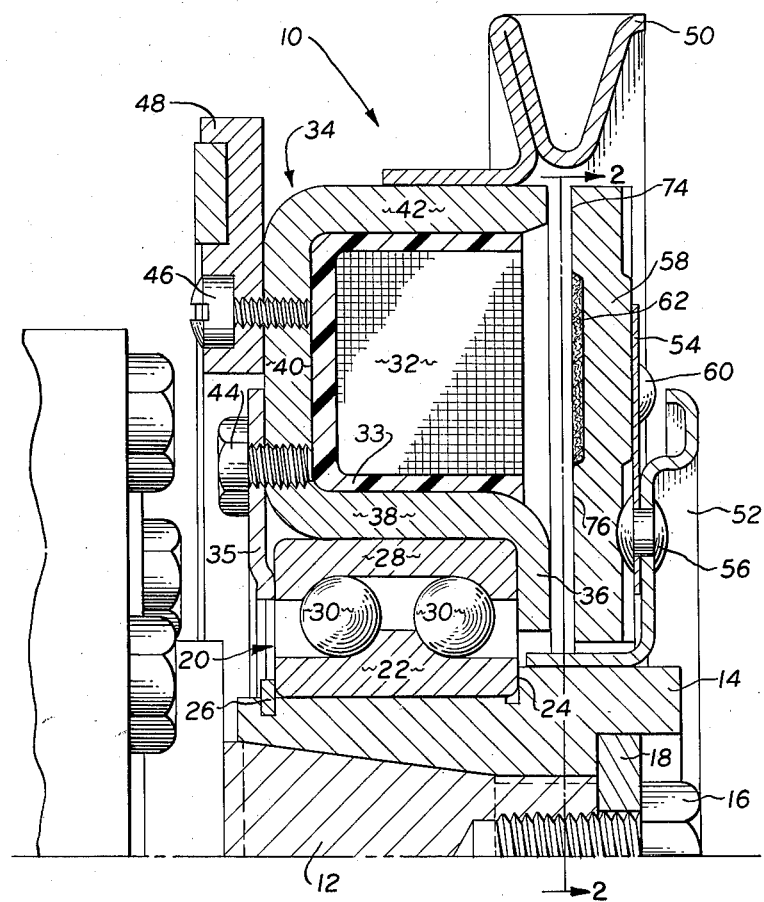
Figure 1 is a partial cross-sectional view of the electromagnetic clutch in which the present invention is utilized.

The electromagnetic device wherein the invention is housed, will hereinafter be described as a clutching mechanism. The clutch as such comprises input and output members with the facility of these members being interchangeable. For explanatory purposes, the armature is described as the input member with the pole assembly and adjacent structure being the output member.

The invention can also be utilized in a brake mechanism wherein the members of the device are adapted to become frictionally engaged with one member being fixed from rotation.

Referring to the drawing for a detailed description of the invention disclosed herein, an electromagnetic clutch 10 is provided with a rotatable tapered shaft 12 having a hub member 14 mounted thereon. The hub member 14 is secured to the shaft by a bolt 16 and washer 18. A bearing means 20 is arranged on the hub member wherein the inner race 22 encompasses the hub member and is axially restrained by a shoulder portion 24 of the hub and a snap ring 26. An outer race 28 of the bearing is supported by ball elements 30 in such a manner that end-wise thrust is absorbed in either axial direction by the ball elements. A toroidal coil 32 is disposed in spaced relation to the bearing 20 and is held in radial alignment by pole housing 34 supported by the bearing 20. Disposed intermediate the pole housing and the coil is a plastic material 33 holding the coil within the housing in an operative position. Pole housing 34 is in the form of a substantially C-shaped section structure encircling three sides of the coil member and is comprised of a flanged portion 36 extending radially inwardly toward the hub member 14, an axially extending portion 38 disposed intermediate the coil and bearing, a radially extending portion 40 adjacent the coil 32 and an axially extending portion 42 in a manner to define planar, radially spaced, annular pole faces. Bolt means 44, secures the pole housing 34 to a ring member 35 with bolt 46 further securing the pole housing to a slip ring assembly 48. Ring member 35 radially extends inwardly over the outer race 28 providing axial rigidity to the bearing assembly 20 and the pole housing 34. Stamped pulley member 50 is secured to the pole housing 34 along the outer radial periphery of the portion 42.

A supporting plate 52 radially extends from the hub member 14 and is circumferentially arranged thereon. A spring disc member 54 is secured to the plate 52 by rivet means 56 and secured to an armature member 58 by rivet 60.

Armature member 58 is adapted to be axially positioned by the resilient action of the spring disc 54 allowing the engagement and disengagement of the armature member 58 with the pole member 34 upon coil excitation.

The transmission of the torque from the pole member 34 to the armature member 58 requires the frictional engagement of the clutching elements. Disposed on the armature member is a friction lining 62, adaptable to transmit the above stated torque and provide a concentrated flux path across the gaps.

Figure 2:
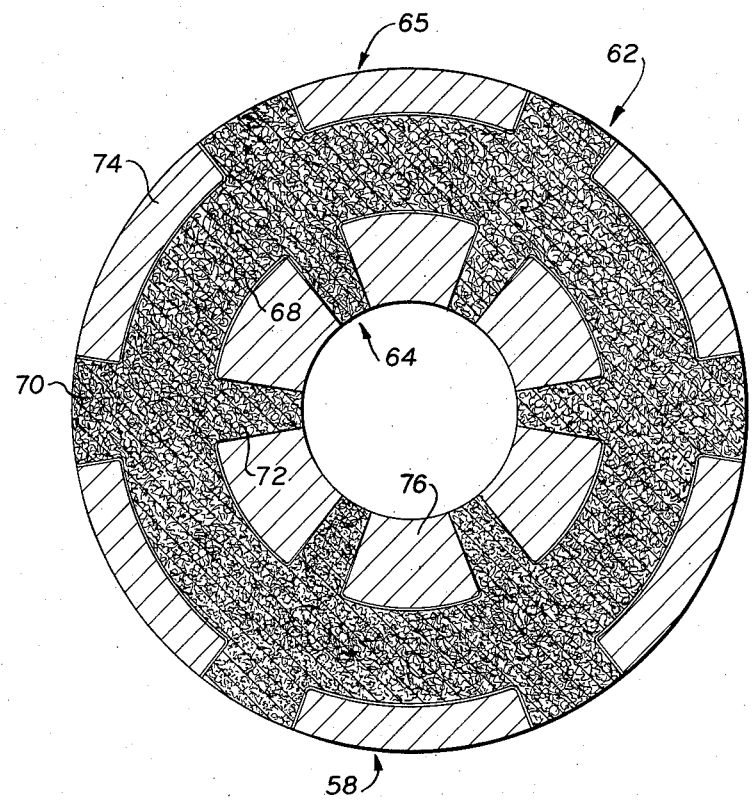
Figure 2 is a reduced detailed view of the armature and the friction lining attached thereto taken along the line 2—2 of Fig. 1 looking in the direction of the arrows.

The armature member 58 and the friction lining 62 attached thereto are further illustrated in Figure 2 of the accompanying drawings with the configuration of the face thereof being defined by an inner periphery 64 and an outer periphery 65 which are radially spaced from one another. The friction lining, in the preferred form, may be considered substantially ring-shaped including a circular disc shaped member 68 radially disposed intermediate the inner 64 and outer 65 peripheries. The disc portion 68 is formed by segmental cut-out portions formed circumferentially around the member with the cut-out portions being equally spaced from one another. The segmental equally spaced cut-out portions are formed at the inner and outer periphery of the lining and radially extend in a manner as to maintain the disc portion of the lining in a constant radial width. Intermediate the cut-out portions and radially extending from the disc portion 68 are segments 70 and 72 which form the inner and outer peripheries of the lining. These extended segments are similarly disposed as the cut-out portions being of equal radial extension and circumferentially spaced around the peripheries of the lining.

Projections 74 and 76 are formed around the inner 64 and outer 65 peripheries of the surface of the armature member 58 which is adjacent the air gap that is provided intermediate the pole member 34 and the armature member 58. The projections 76 extend from the inner periphery of the armature member 58 radially outwardly toward the outer periphery. The outer projections 74 radially extend inwardly toward the inner periphery of the armature member 58. The projections 74 and 76 being on the same plane are not continuous between peripheries due to the positioning of the disc shaped lining 68 disposed intermediate thereof. These projections on the armature member 58, being equally circumferentially spaced from one another, have depressed portions interconnected and of the same plane intermediate thereof with these depressed portions adaptable to receive the disc-shaped ring member 68 and the extended portions 70 and 72 of the lining. The lining with its cut-out segments is formed in a manner wherein the cut-out segments having similar outer peripheral configuration with the projections are adaptable to receive the projections forming a close fit assembly.

From this above arrangement, it can be seen that the projections 74 and 76 of the armature member 58 and the cut-out segments of the lining 62 are radially aligned with one another so as to form at their surfaces a plane extending across the inner face of the movable member adaptable to engage the pole pieces substantially adjacent thereof. The armature projections are formed in a manner so as to provide equal surface area between the outer projections 74 and the inner projection 76.

The purpose for this spacing and above stated surface arrangement is to provide in a magnetically-operated mechanism sufficient flux passage area on the pole-engaging surface of the armature member 58, while at the same time affording maximum friction material engaging surface between the pole 34 and armature 58 members. The projections 74 and 76 of the armature member 58, being radially aligned with ane another provide a low reluctance path relative to a path including a part of the friction material 62. The projection arrangement is disclosed as such for illustrative purposes only, since the segments can be staggered but in a limited, substantially radial alignment with one another. The effect of the torque transmittal and flux passage therebetween is not hindered until the limitation has been imposed by an overextension of the staggering. When the staggering exceeds approximately one-half of a segment or a major portion thereof, there is a reduction of the effective flux transmission between the engageable members, such that the operation of the device is inefficient in proportion to its rated torque capacity. The most effective means and most desirable arrangement of the segments is presented on the enclosed drawing. The total area of the armature member projections 74 and 76 is sufficient to carry all of the flux emanating from the coil member 32. It is understood, therefore, that this arrangement utilizes friction material on one of the operating surfaces without increasing the reluctance of the magnetic circuit by disposing the friction material in a novel manner on one of the operating surfaces. The extended segmental spacing of the friction material 62 in this arrangement provides adequate friction-engageable material reducing the amount of wear occurring between the engageable members of the mechanism along with aiding in the concentration of the flux passing through the members. As illustrated in Figure 1, actual contact between the inner ring member of the lining and the pole member is not obtainable in this mechanism with the frictional contacting surfaces occurring at the inner and outer peripheries of the armature and lining as stated above, the primary function of the center portion of the disc is to enable the production of the material to be formed in one piece.

The electromagnetic clutch operates in the following manner. The pole housing 34 and adjacent assembly are freely supported on the bearing means 20 with the inner race 22 of the bearing secured to the hub portion 14. Axially spaced from the pole member is the armature member 58. The shaft member 12 transmits its rotative motion through the hub portion 14 and the supporting plate 52 to the armature member 58 wherein conjoint rotation of the two members occurs. Upon excitation of the coil member 32, the flux path occurs through the pole pieces extending from portion 40 to 42, axially across the gap and into the projections 74 of the armature, through the armature member 58 through the projections 76 returning across the gap into the flange portion 36 and the portion 38 of the pole housing 34, the action of the magnetic flux drawing the armature member 58 into frictional contact between the stated projections 74 and 76 and the pole pieces 42 and 36.

The axial movement of the armature member 58 is accomplished through the resilient action of the spring disc means 54 disposed intermediate the armature member 58 and the supporting plate 52. Upon frictional contact of the two members, the pole housing and adjacent assembly along with the bearing means supported by the ball bearings 30 will rotate simultaneously, completing the clutching action. The friction material 62 arrangement on the armature member 58 enables the engagement of the movable elements to be free of the noise or squeal usually accompanying contacting metal surfaces.

As was previously stated, the formation of the armature member 58 and the friction lining 62 in equally spaced segmental portions provides a sufficient amount of concentrated flux passage through the armature member 58 while still providing maximum frictional engaging surface area between the rotatable members. The friction lining 62 can be formed of either a magnetically permeable or a highly reductive material. If a magnetically permeable friction material is used it is understood that the reluctance of the friction material 62 is still relatively high as compared to the pole piece material. In either case, the function of the lining is to provide a frictional contacting surface tending to reduce frictional wear on the metal surfaces of the armature member 58 and further provide good gripping action between the members 34 and 58.

While the present invention has been described in connection with certain embodiments, it is to be understood that the foregoing description is merely exemplary and that the concept of this invention is susceptible of numerous other modifications, variations and applications which will be apparent to persons skilled in the art. The invention is to be limited, therefore, only by the broad scope of the appended claims.

What I claim is:

1. A magnetic device comprising an armature, a pole member having planar, radially spaced, annular pole faces, a plurality of axially extending projections disposed in radially spaced and aligned pairs on said armature with said pairs being circumferentially spaced relative to each other and positioned for engagement with said pole faces, and a unitary substantially ring-shaped friction element attached to said armature and disposed in coplanar relationship relative to said projections, said friction element having a plurality of radially spaced inner and outer cut-out portions disposed in radially aligned and circumferentially spaced pairs relative to each other and coincident with said projections.

2. A magnetic device comprising cooperative, magnetic driving and driven members, energizing means operable to control frictional engagement of said members, and a high reluctance friction material secured to one of said members, said friction material including a substantially ring-shaped intermediate portion and a plurality of radially spaced segments extending from said intermediate portion, said segments being disposed in radially aligned circumferentially spaced pairs for frictional engagement with the other of said members.

3. A magnetic device comprising a coil, a pole housing, an armature member having a multiplicity of axially extending radially spaced projections disposed in circumferentially spaced pairs thereon with a major portion of the projections of each pair being disposed in radial alignment with each other, and friction material of uniform thickness disposed intermediate the projections for frictionally engaging the pole housing.

4. A magnetic device comprising a magnetic driven member, a substantially ring-shaped magnetic driving member, energizing means operable to control frictional engagement of said members, said driving member having radially spaced axial projections disposed in circumferentially spaced groups thereon with a major portion of the projections of each group being radially aligned with one another, said radially aligned and spaced projections having surfaces substantially equal in area to one another and capable of carrying all of the magnetic flux generated by said energizing means, and high reluctance friction material disposed intermediate of and adjacent to the projections for frictionally engaging the driven member.

5. A magnetic device comprising cooperative magnetic driving and driven members, energizing means operable to control frictional engagement of said members, said driving member having a high reluctance friction material attached thereto, said friction material being substantially ring-shaped in configuration, of uniform thickness and having a multiplicity of radially spaced cut-out portions covering a major area thereof with the radially adjacent cut-out portions being disposed in radially aligned circumferentially spaced pairs, said driving member having axially extending projections which are coincident with and received by said cut-out portions, said projections being capable of carrying all of the magnetic flux emanating from the engaging means.

6. A magnetic device comprising relatively rotatable magnetic members, energizing means operable to control frictional engagement of said members, one of said members defining a pole member having annular, radially spaced pole faces, said other member having radially spaced, pole face engaging projections disposed in radially aligned circumferentially spaced pairs thereon, and friction material of higher magnetic reluctance than said projections being disposed intermediate the projections and extending radially therebetween the full radial extent of the other member.

References Cited in the file of this patent

UNITED STATES PATENTS

| 786,412 | Cutler | Apr. 4, 1905 |
| 1,122,483 | Cutler et al. | Dec. 29, 1914 |
| 1,622,261 | Payne | Mar. 22, 1927 |
| 2,351,598 | Cadman | June 20, 1944 |
| 2,738,044 | Winther | Mar. 13, 1956 |
| 2,739,684 | Meyer | Mar. 27, 1956 |
| 2,796,962 | Pierce | June 25, 1957 |